US007448780B2

(12) United States Patent
Hurley

(10) Patent No.: US 7,448,780 B2
(45) Date of Patent: Nov. 11, 2008

(54) MARINE LIGHT MOUNTING SYSTEM AND METHOD FOR PRODUCING SAME

(76) Inventor: Todd R. Hurley, 1125 Lake Shore Dr., Escanaba, MI (US) 49829

( * ) Notice: Subject to any disclaimer, the term of this patent is extended or adjusted under 35 U.S.C. 154(b) by 0 days.

(21) Appl. No.: 11/741,175

(22) Filed: Apr. 27, 2007

(65) Prior Publication Data

US 2007/0201238 A1 Aug. 30, 2007

Related U.S. Application Data

(60) Provisional application No. 60/888,820, filed on Feb. 8, 2007.

(51) Int. Cl.
*B60Q 1/26* (2006.01)
(52) U.S. Cl. .................. 362/477; 362/370; 362/432
(58) Field of Classification Search ............... 362/285, 362/368, 369, 370, 432, 477, 523, 543, 546, 362/549; 441/13, 16
See application file for complete search history.

(56) References Cited

U.S. PATENT DOCUMENTS

| 2,907,295 | A | | 10/1959 | Delaney |
| 2,908,807 | A | | 10/1959 | Perkins |
| 3,080,581 | A | | 3/1963 | Smihal |
| 4,845,597 | A | | 7/1989 | McCaghren |
| 5,544,031 | A | * | 8/1996 | Blanton ................. 362/432 |
| 5,878,686 | A | | 3/1999 | Anderson |
| 6,079,852 | A | * | 6/2000 | Kamaya et al. ........... 362/371 |
| 6,550,948 | B1 | * | 4/2003 | Filbrun et al. ........... 362/523 |
| 2001/0038536 | A1 | | 11/2001 | Wiggerman et al. |

OTHER PUBLICATIONS

Trim Bright—LED Underwater Trim Tab Lights, Advertisement, 2 pages, copyright 2007 [online], [retrieved on Apr. 17, 2007] retrieved from the Avalon Marine Products website, <URL:http://www.avalonmarineproducts.com/index.php?productID=115>.
Aqua Tab Lites, Advertisement, 1 page, [online], [retrieved on Jan. 16, 2007] retrieved from the Precision Marine Hardware website, <http://www.precisionmarinehardware.com/html/aquatab_lites.html>.

* cited by examiner

*Primary Examiner*—Y My Quach Lee
(74) *Attorney, Agent, or Firm*—Brooks Kushman P.C.

(57) ABSTRACT

A marine light mounting system for attaching at least one light to a marine vehicle includes a support structure for supporting one or more lights on the marine vehicle. The support structure includes a light mounting portion configured to receive a housing of one of the lights, and to facilitate attachment of the housing to the support structure. The light mounting portion includes a surface that may be generally arcuate, and which is configured to cooperate with the housing such that the surface does not completely surround a housing of the light. This facilitates attachment of the housing to the support structure while the light is electrically wired to a power source remote from the housing. This provides flexibility with regard to mounting the light in the first instance, and changing the orientation of the bracket in the second.

17 Claims, 4 Drawing Sheets

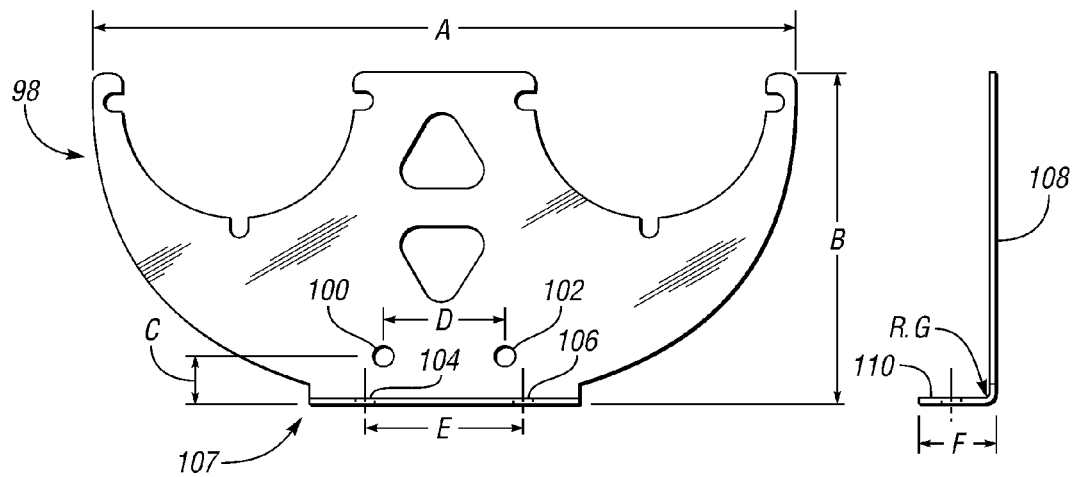
*Fig. 4A.*  *Fig. 4B*
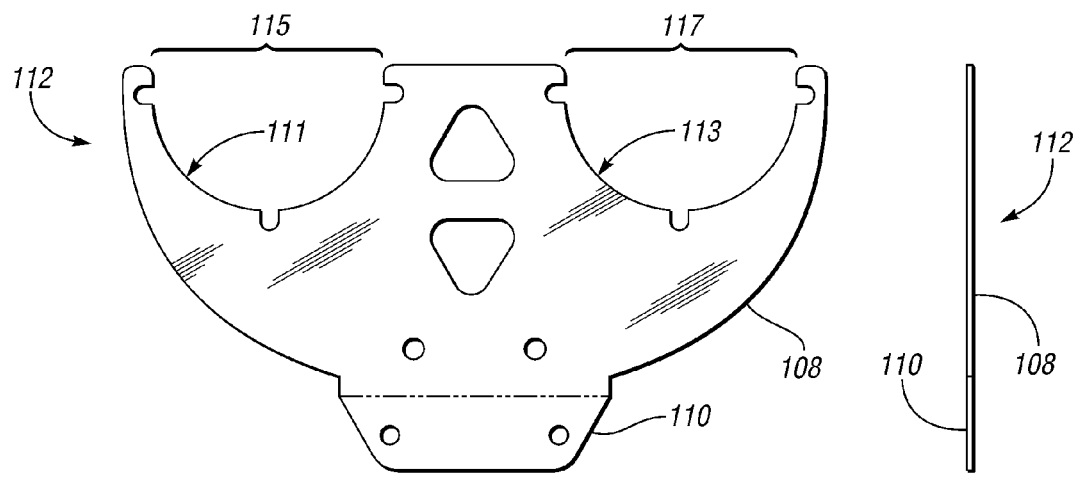
*Fig. 5A.*  *Fig. 5B*

MARINE LIGHT MOUNTING SYSTEM AND METHOD FOR PRODUCING SAME

CROSS-REFERENCE TO RELATED APPLICATIONS

This application claims the benefit of U.S. provisional application Ser. No. 60/888,820, filed 8 Feb. 2007, which is hereby incorporated herein by reference.

BACKGROUND OF THE INVENTION

1. Field of the Invention

The present invention relates to a marine light mounting system and a method for producing such a system.

2. Background Art

Owners and operators of watercraft are well aware of the desirability of having a reliable source of light on their vehicle. Bow and stern lights are often required by law; however, these types of lights are primarily used so that operators of other marine vehicles can see approaching vessels, and navigate accordingly. These types of navigation lights do little to aid the vehicle operator to see objects in low visibility conditions. Indeed, fishermen often operate their vehicles before sunrise or after sunset, and are in need of reliable lights for a variety of reasons.

In addition to aiding fishermen, a reliable source of light can be valuable to non-fishermen as well. For example, many boats are trailered to and from a launching facility, rather than being kept in a boat slip or stored at a marina. In such cases, the boats are often launched into or removed from the water in the earlier morning hours or late at night. Thus, having a reliable source of light for a boat may provide a significant benefit in these situations.

One example of a marine lamp is described in U.S. Pat. No. 2,908,807 issued to Perkins on 13 Oct. 1959. Perkins describes a marine lamp that has a support frame that can be mounted on the hull or various other locations on a boat. The marine lamp described in Perkins is configured to protect the electrical connections from the ambient corrosive influences of the marine environment. For example, the housing includes a gasket and a threaded cap, each of which has an aperture therethrough to receive an electrical wire connected to the lamp. Tightening the cap causes the gasket to contact the electrical wire, thereby sealing off the lamp fixture from the ambient environment.

One limitation of the marine lamp described in Perkins is the need to electrically disconnect the conductor wire from either the lamp or its power source in order to feed the conductor wire through the openings in the cap and gasket. Because the housing provides the attachment to the marine vehicle, changing the orientation of the attachment necessarily changes the orientation of the lamp. For example, there may be areas on a boat where the housing will only fit in one direction, and yet it may be desirable to have the light shine in a different direction. This is not possible with the Perkins design, since it is the light housing that attaches directly to the boat. Even if it were possible, however, changing the orientation of the light vis-à-vis the housing would require electrically disconnecting the conductor wire from either the light fixture or the power source. Such an operation may be time consuming and difficult, assuming it can be performed at all.

Therefore, it would be desirable to have a marine light mounting system, and a method for producing such a system, that includes a support structure separate from the lamp housing. Such a system could allow the support structure to be mounted with different orientations—i.e., turned 180°—without changing the direction of the light. Moreover, it would be desirable to provide such a support structure that would allow lights to be attached and detached without having to electrically disconnect them from either the light fixture or the power source.

SUMMARY OF THE INVENTION

The present invention provides a marine light mounting system, and a method for producing such a system, that provides flexibility with regard to the mounting orientation of a support structure, along with the ability to attach and detach one or more lights without the need to electrically disconnect the lights either from the lamp fixture or the electrical power source.

Embodiments of the present invention provide a mounting bracket that can be attached at various locations on a marine vehicle, such as a boat. In particular, the bracket may be attached to a trim tab on a boat. This provides lighting at the stern of the boat that may be useful for general visibility, as well as in specific situations, such as night fishing, or traileringing a boat when it is dark. In addition, attaching the bracket to the trim tab of the boat allows the direction of the light to be changed as the trim tab is moved up or down. Thus, as the trim tab is moved downward, the lights may be submerged and provide underwater lighting.

Embodiments of the invention also provide a bracket such as described above that includes an outwardly extending tab that is configured to be oriented substantially parallel with a surface of the trim tab. The outwardly extending tab may, in effect, provide an extension to the trim tab, thereby providing increased plane control to the vehicle operator. In addition, the tab may be used as a secondary mounting feature to facilitate attachment of the bracket either to the trim tab, or in other locations. One embodiment of the mounting system includes a bracket having two partially circular mounting portions, configured to receive cylindrical light housings. The use of the partially circular geometry allows the light housings to be inserted into the bracket without having to disconnect the electrical wires. This is in contrast to a bracket that is configured with a hole to receive the cylindrical light housing, because in such a case, the wire would have to be disconnected from the lamp or from the power source in order to feed the wire through the hole in the bracket. Such is not the case in embodiments of the present invention. This provides flexibility with regard to the mounting of the support bracket, and subsequent moving of the bracket to different positions on the boat. Because the lights can be quickly disconnected from the bracket, they can be moved separately, and the bracket can be repositioned without interference from the electrical wiring.

As noted above, the bracket can be mounted to a trim tab or other location on a boat where the lights may be partially or fully submerged. In such cases, embodiments of the present invention provide a mounting bracket having one or more apertures therethrough, to allow water to flow through, rather than around, the bracket. This reduces drag and increases fuel efficiency. In addition to mounting on a trim tab, embodiments of the present invention provide a support structure, such as a bracket, that can be mounted above the waterline, for example, on a gunwale. In a fishing boat, the gunwale is typically below the level of the seat, and therefore, such a mounting position would provide fishermen with light, while not interfering with their line of sight. In addition, embodiments of the present invention may include a support bracket substantially as described above, but further having a pivot mount that allows the bracket and lights to be rotated without having to dismount the bracket from the boat. This may be particularly advantageous in the above water gunwale mounting configuration, which would allow the direction of the light to be changed, without changing the orientation of the boat.

Embodiments of the invention also include a marine light mounting system for attaching at least one light having a corresponding housing to a marine vehicle. The mounting system includes a support structure for supporting the at least one light on the marine vehicle. The support structure includes a light mounting portion configured to receive a housing of one of the lights and to facilitate attachment of the housing to the support structure. The light mounting portion includes a surface configured to cooperate with the housing such that the surface is adjacent only a portion of the housing when the light mounting portion receives the housing therein. This facilitates attachment of the housing to the support structure while the light is electrically wired to a power source remote from the housing. Embodiments of the present invention further include a support structure as described above having a plurality of the light mounting portions, each of which is configured to receive a respective housing of one of the at least one lights.

Embodiments of the invention also include a marine light mounting system that includes a unitary support structure for supporting at least one light on the marine vehicle. The unitary support structure includes a light mounting portion that includes at least one arcuate surface configured to receive a housing of a light while the light is electrically wired to a power source remote from the housing.

Embodiments of the present invention further include a method for producing a marine light mounting system for attaching at least one light having a corresponding housing to a marine vehicle. The method includes forming a generally planar support structure, and forming a light mounting portion in the support structure. The method further includes bending a first portion of the support structure generally perpendicularly to a second portion of the support structure. The first portion includes the light mounting portion, which is configured with an opening as viewed parallel to a plane containing the first portion of the support structure. This facilitates entry of the housing of one of the lights into the opening for attachment of the housing to the light mounting portion while the light is electrically wired to a power source remote from the housing.

The generally planar support structure can be made from a sheet of non-corrosive material, such as stainless steel, titanium, aluminum alloy, etc. The basic shape of the support structure can be formed by any manufacturing method effective to produce the desired configuration—e.g., laser cutting, water jet cutting, stamping, etc. To facilitate attachment of the light housing to the support structure, mounting features can be formed in the bracket to receive fasteners, such as threaded fasteners and the like. These mounting features may be in the form of holes through the support structure, or they may be in the form of slots, which facilitate faster connect and disconnect operations for the light housings.

In addition to the mounting features for the light housings, a number of apertures can be formed in the support structure to facilitate attachment of the support structure to the marine vehicle. One or more of these apertures, or mounting holes, may be formed in the first portion of the support structure, and one or more may be formed in the second portion of the support structure. As described above, the second portion of the support structure may be bent to be substantially perpendicular to the first portion, in which case, the mounting holes will be oriented perpendicularly to each other after the bending operation. This provides flexibility with regard to how the support structure is mounted to the marine vehicle. Because the mounting holes can be used to mount the support structure to a vehicle, the portion of the support structure containing the mounting holes may generally be referred to as a vehicle mounting portion.

BRIEF DESCRIPTION OF THE DRAWINGS

FIGS. 4A and 4B illustrate some dimensions of a light mounting system in accordance with the present invention;

FIGS. 5A and 5B show a sheet metal blank prior to its being bent into a bracket for the light mounting system shown in FIGS. 4A and 4B;

DETAILED DESCRIPTION OF THE PREFERRED EMBODIMENT(S)

Figure 1:
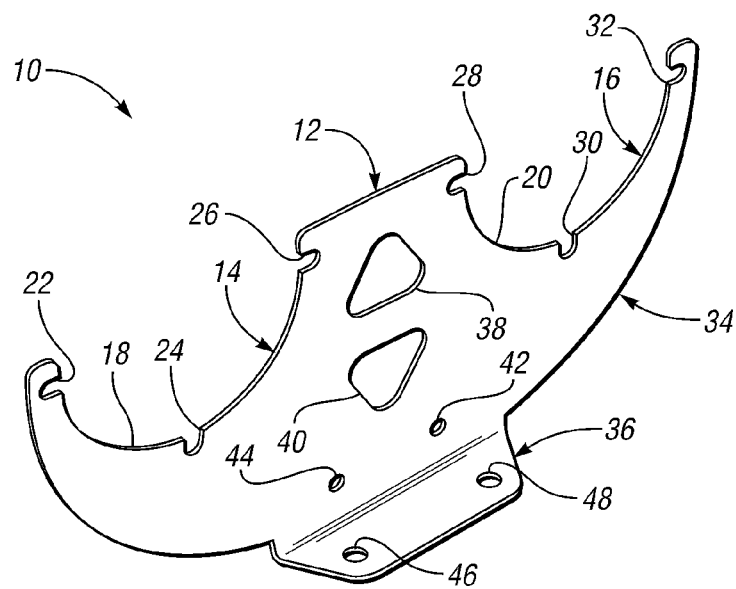
FIG. 1 shows a marine light mounting system in accordance with one embodiment of the present invention.

FIG. 1 shows a marine light mounting system 10 in accordance with one embodiment of the present invention. The mounting system 10 includes a support structure, or bracket 12. The bracket 12 includes a pair of light mounting portions 14, 16. The light mounting portions 14, 16 respectively include curved surfaces 18, 20 that are configured to cooperate with a housing on a marine light when the housing is attached to the bracket 12. As described more fully below, when lights are attached to the bracket 12, the surfaces 18, 20 will be adjacent to only a portion of the corresponding housing. This provides advantages over a closed surface such as would be formed if the light mounting portions 14, 16 formed full circles, instead of having a contour that forms partial circles as shown in FIG. 1. Although shown in FIG. 1 as forming partial circles, it is understood that other embodiments of the present invention may have light mounting portions that have non-circular contours, such as ellipses or rectilinear shapes. Formed in each of the light mounting portions 14, 16 are a plurality of mounting features, or slots 22, 24, 26, 28, 30, 32. As described below, the slots 22-32 facilitate fast and secure connection of the light housings to the respective light mounting portions 14, 16.

In general, the bracket 12 includes a first generally planar portion 34 and a second generally planar portion 36, which, like the embodiment shown in FIG. 4B, are oriented substantially perpendicularly to each other. The first portion 34 includes the light mounting portions 14, 16, and further includes open areas in the form of two large apertures 38, 40, which are provided to allow water to flow through when the bracket 12 is mounted low on a boat, for example, on a trim tab. Allowing the water to flow through the bracket 12, instead of forcing it to go around, reduces drag and increases fuel efficiency. The first portion 34 of the bracket 12 also includes a pair of apertures 42, 44, which are configured to receive fasteners to attach the bracket 12 to a portion of a boat, for example, at a trim tab. Similarly, the second portion 36 of the bracket 12 includes apertures 46, 48, which may also be used to mount the bracket 12 to a portion of the boat, for example, on a gunwale or a trim tab.

Figure 2:
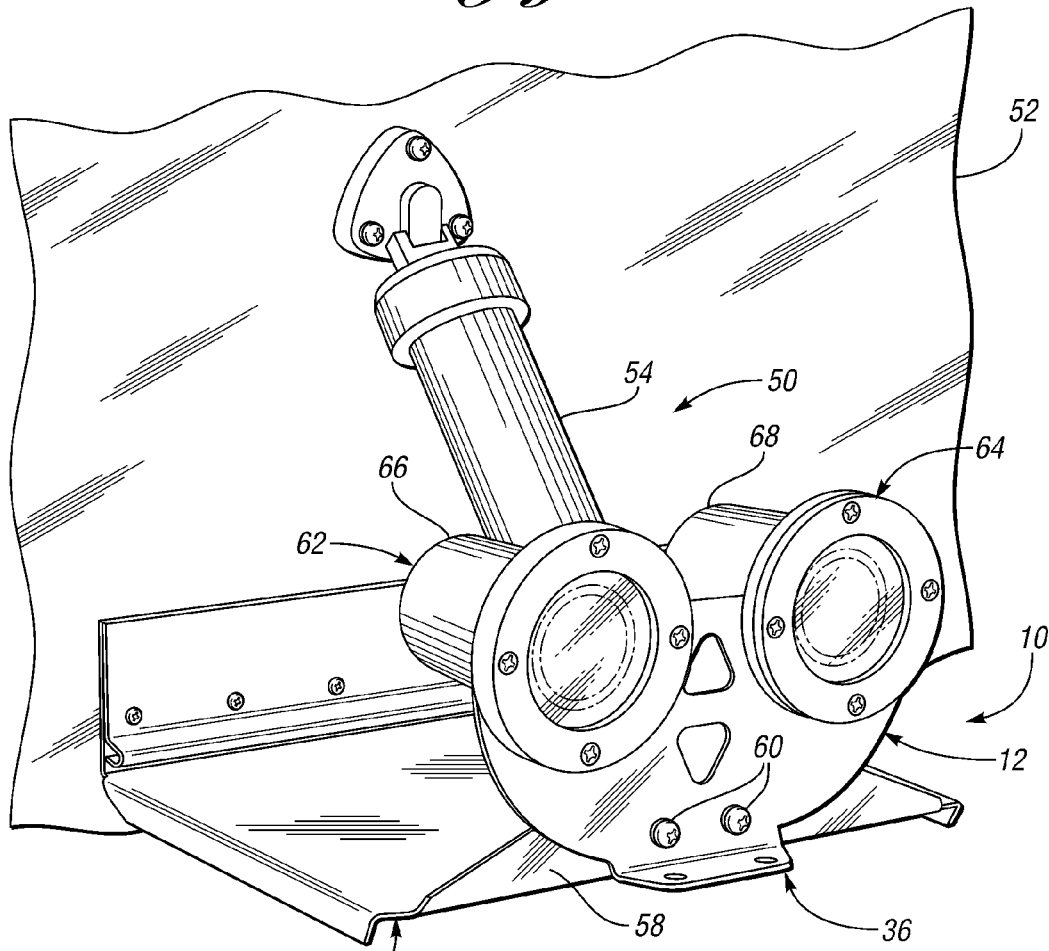
FIG. 2 shows the light mounting system of FIG. 1 attached to a trim tab on a transom of a boat.

FIG. 2 shows the bracket 12 attached to a trim tab 50 on a transom 52 of a boat. The trim tab 50 includes an actuator, or a hydraulic cylinder 54, that is used to change the orientation of an adjustable planar surface 56. As is well known to boaters, the use of one or more trim tabs helps to keep the boat oriented substantially horizontally as it moves through the water. This provides a number of benefits, including increased efficiency of operation.

As shown in FIG. 2, the bracket 12 is attached to an upright portion 58 of the trim tab 50. Threaded fasteners 60 are inserted through the mounting holes 42, 44—see FIG. 1—and may be directly threaded into the upright portion 58, or may have washers and nuts to complete the attachment. Also shown in FIG. 2, the second portion 36 of the bracket 12 extends outwardly from the planar surface 56 of the trim tab 50. Although the second portion 36, which forms a tab, is disposed along only a portion of the adjustable planar surface 56, in other embodiments, it may be disposed along a greater portion, including the entire length of the planar surface 56. In addition, the tab 36 may extend outwardly from the planar surface 56 to a greater extent than is shown in FIG. 2. In this way, the tab 36 can act to extend the adjustable planar surface 56 and provide a vehicle operator with greater control with regard to planing the boat. In addition, the tab 36 can provide a convenient way to attach the bracket 12 to other types of trim tabs, for example, trim tabs that do not have an upright portion, such as the upright portion 58. In such cases, mounting holes, such the apertures 46, 48 shown in FIG. 1, can be used in conjunction with fasteners (not shown), and the tab 36 attached directly to the planar surface of the trim tab.

FIG. 2 also shows two marine lights 62, 64, each of which has a respective housing 66, 68. The housings 66, 68 have a generally cylindrical portion that fits securely into the arcuate light mounting portions 14, 16—see FIG. 1. Although not visible in FIG. 2, threaded fasteners may be used to attach the housings 66, 68 to the bracket 12 utilizing the slots 22-32. Although the mounting system 10 shown in FIGS. 1 and 2 is configured for mounting two marine lights, it is understood that other embodiments may be configured for mounting only one light, or more than two lights.

Figure 3:
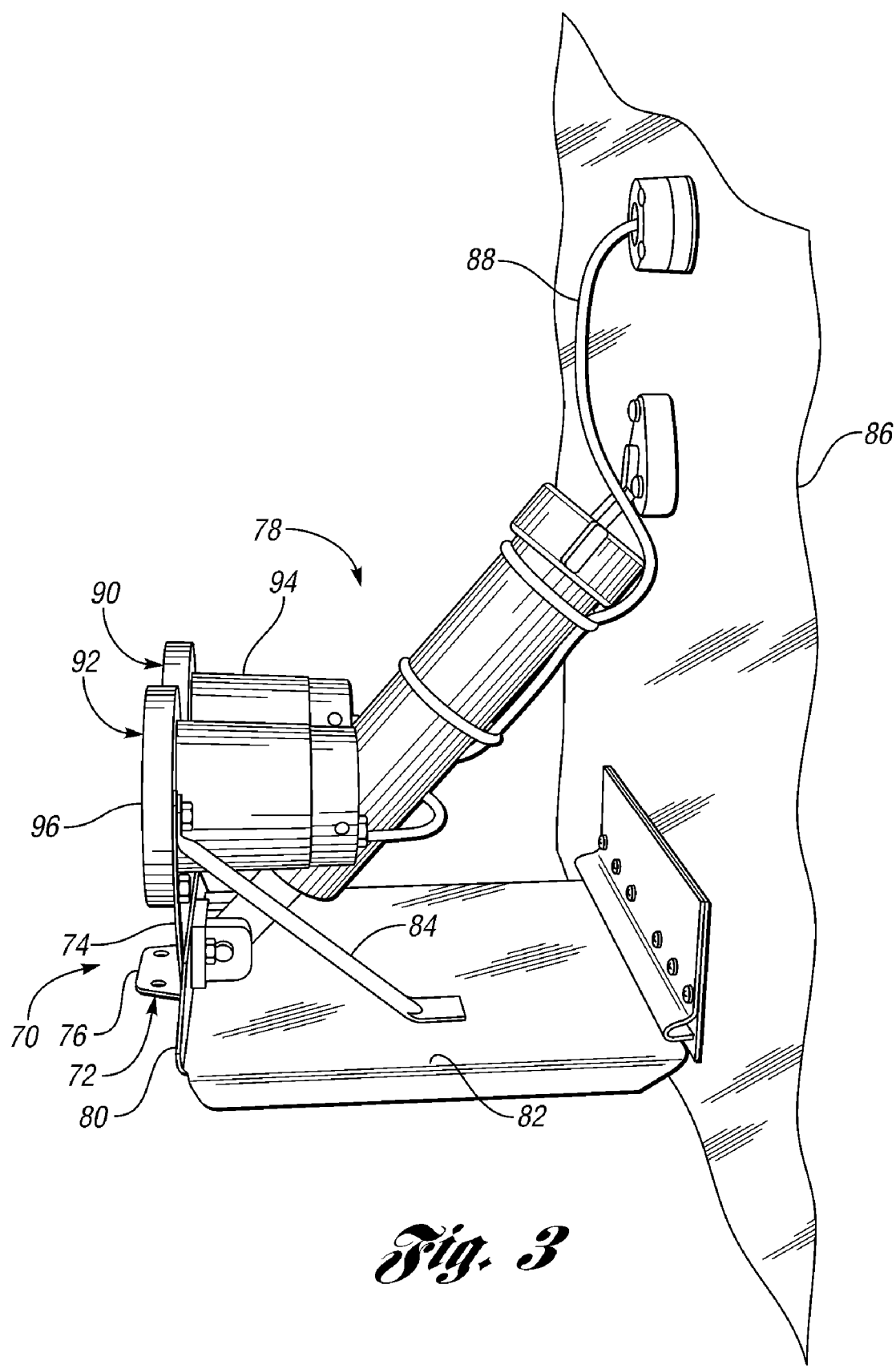
FIG. 3 shows a light mounting system in accordance with another embodiment of the present invention, including a reinforcing member attached to a support structure for carrying the marine lights.

Because it is contemplated that marine light mounting systems in accordance with the present invention may be used on marine vehicles of various sizes and having various power ratings, it may be desirable to provide additional support to a support structure, such as the bracket 12. FIG. 3 shows a marine light mounting system 70 in accordance with another embodiment of the present invention. The mounting system 70 includes a support structure, or bracket 72, having first and second portions 74, 76 similarly configured to the bracket 12 shown in FIGS. 1 and 2. The bracket 72 is attached to a trim tab 78, and in particular, to an upright portion 80 extending from an adjustable planar surface 82. In the embodiment shown in FIG. 3, the mounting system 70 also includes a reinforcing member 84 disposed between the first portion 74 of the bracket 72 and the adjustable planar surface 82 of the trim tab 78. The trim tab 78 is attached to a transom 86 of a boat. The reinforcing member 84 can be attached to a bracket, such as the bracket 72, and a planar surface of a trim tab, such as the surface 82, by fasteners, welding, or any other method effective to provide secure attachment.

Also shown in FIG. 3 is the electrical wiring 88 which enters the engine compartment through the transom 86 and is attached to the two lights 90, 92. As shown in FIG. 3, the electrical wire 88 attaches to the lights 90, 92 through a back portion of their respective housings 94, 96. Thus, it is readily apparent that mounting systems that provide a hole into which the light housings 94, 96 must be inserted, would force the electrical wiring 88 to be disconnected either from the lights 90, 92 themselves, or from the power source on the other side of the transom 86, in order to secure the light housings.

As described above, a support structure, such as the bracket 12 or the bracket 72, can be made from any material effective to allow the marine light mounting system to perform its intended purpose. One material that has been found to be effective is 16 gauge type 304 stainless steel. FIG. 4A shows a support structure 98 configured similarly to the brackets 12, 72 described above. The support structure, or bracket 98, is made from the 16 gauge stainless steel material described above. Although the dimensions may vary for any given application, a support structure, such as the bracket 98 shown in FIG. 4A, may have an overall length (A) of between 8 and 10 inches (in.). Such a bracket may have an overall height (B) of between 3 and 5 in., and further, may have mounting holes 100, 102 having diameters between $7/32$ and $9/32$ in.

The mounting holes 100, 102 may be located a distance (C) of approximately $5/8$ to $7/8$ in. from a bottom of the bracket 98. Similarly, mounting holes 104, 106 may be of the same diameter as the holes 100, 102, and as shown in FIG. 4A, are centered on the bracket 98, and have a spacing (E) of $1\frac{3}{4}$ to $2\frac{1}{4}$ in. As described above, mounting holes, such as the mounting holes 100, 102, 104, 106 facilitate attachment of the bracket 72 to a vehicle at various locations. Thus, the portion of the bracket 72 containing the mounting holes 100, 102, 104, 106 may generally be referred to as a vehicle mounting portion 107.

FIG. 4B shows the side view of the bracket 98 having a first portion 108 and a second portion 110 similar to the first and second portions 34, 36 shown in FIG. 1. As readily seen in FIG. 4B, the first and second portions 108, 110 are oriented generally perpendicularly to each other. The second portion 110, which, as described above, may form a tab, has a width (F) that may be $3/4$ to $1\frac{1}{4}$ in. Also shown in FIG. 4B is a radius (G) between the first and second portions 108, 110 which may be 0.040-0.080 in. Although the examples described above provide dimensions for certain embodiments of the present invention, it is understood that other embodiments may have different dimensions. In general, a marine light mounting system in accordance with the present invention may have any dimensions effective to allow the mounting system to function as desired.

FIGS. 5A and 5B show a flat piece of sheet stock 112 having the geometry of the bracket 98 shown in FIG. 4A, but prior to the second portion 110 being bent relative to the first portion 108. By producing the mounting system in this way, the blank 112 can be formed quickly and cost effectively—e.g. by stamping, laser cutting, wire electrical discharge machining (EDM), water cutting, etc. In embodiments that utilize a reinforcing member, such as the reinforcing member 84 shown in FIG. 3, the reinforcing member can be attached in a secondary operation, for example via welding or through the use of separate fasteners. Moreover, it is worth noting that embodiments of the present invention may omit the bending step, thereby resulting in a support structure generally configured as a flat sheet of material such as shown in FIGS. 5A and 5B.

As shown in FIG. 5A, the first portion 108 includes light mounting portions 111, 113, which are configured with openings 115, 117. The openings 115, 117 appear as openings in the plan view of FIG. 5A, but they will also appear as openings when viewed along a plane containing the first portion 108—e.g., as viewed from the top of the drawing figure looking downward. With this configuration, the openings 115, 117 facilitate entry of light housings, such as the light housings 66, 68 shown in FIG. 2, into the light mounting portions 111, 113 without disconnecting the electrical wiring. This is in contrast to a mounting system that relies on holes through a bracket to receive the light housings. Although such holes would also appear as openings in the plan view of FIG. 5A, they would not appear as openings when viewed along the plane containing the first portion 108. In such a configuration, the electrical wiring would need to be disconnected to allow the light housings to be inserted into the holes.

Figure 6:
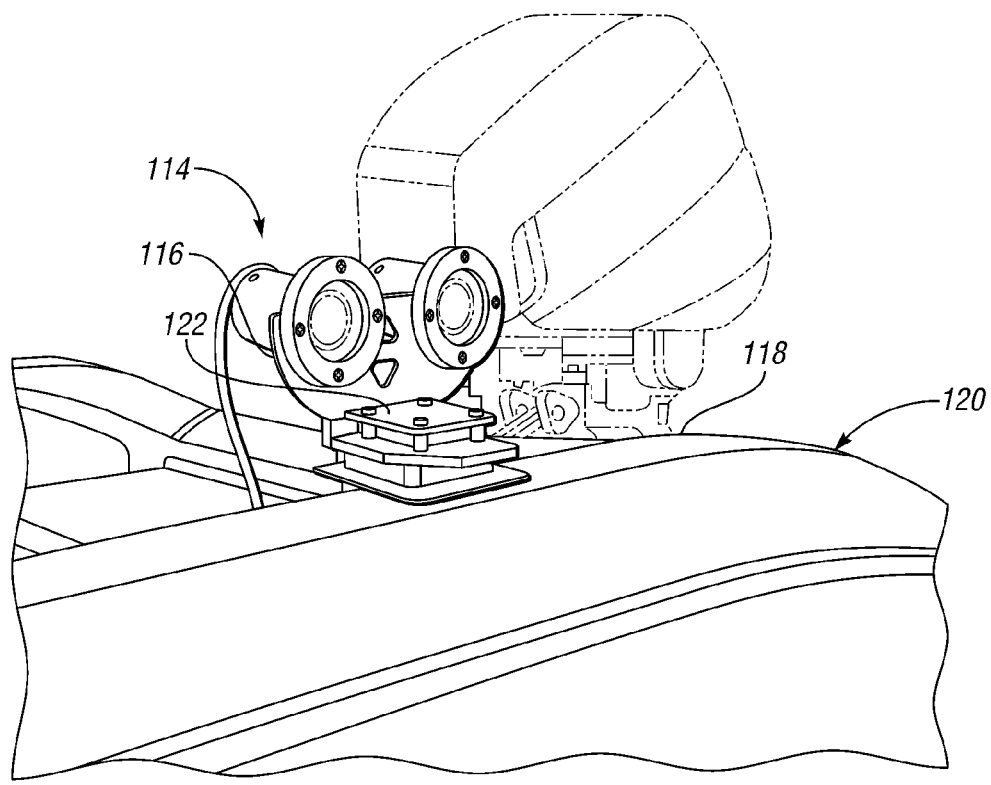
FIG. 6 shows a light mounting system in accordance with the present invention attached to an upper portion of a boat, and in particular, on a gunwale.

As described above, embodiments of the present invention include marine light mounting systems that can be mounted in a variety of locations on a boat. FIG. 6 shows a mounting system 114 in accordance with the present invention. The mounting system 114 includes a support structure, or bracket 116, that is mounted to a gunwale 118 of a boat 120. In the embodiment shown in FIG. 6, the bracket 116 is mounted to a downrigger base 122 attached to the gunwale 118. Although not visible in FIG. 6, it is readily understood that the bracket 116 includes a tab, such as the tab 36 shown in FIG. 1, that facilitates fast and easy mounting to the downrigger base 122.

Figure 7:
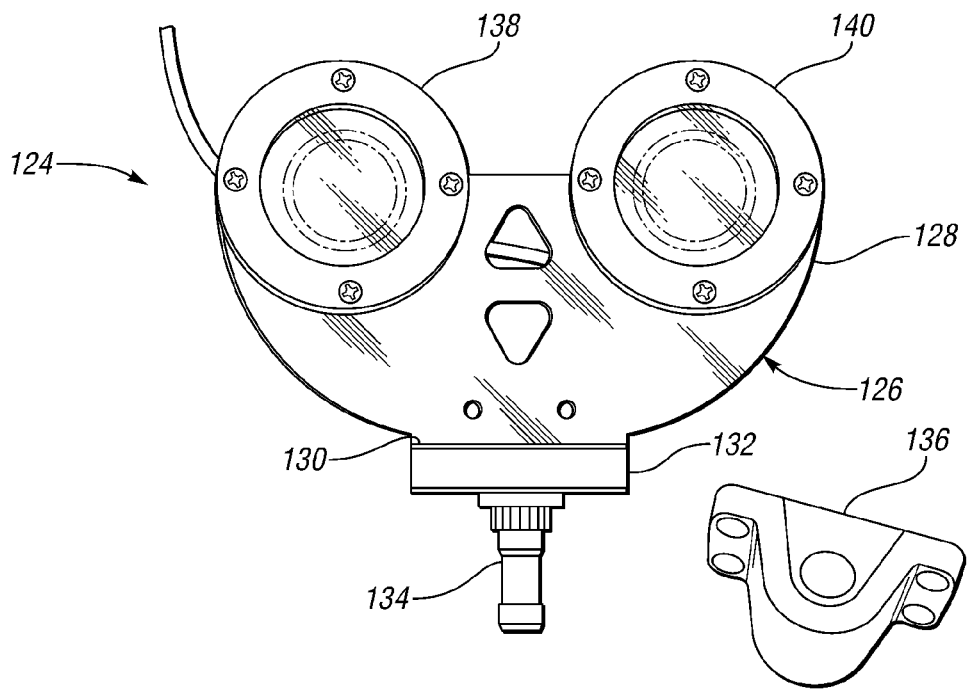
FIG. 7 shows a light mounting system in accordance with the present invention configured for a pivot mount.

Although the orientation of the bracket 116 is fixed in the embodiment shown in FIG. 6, mounting systems in accordance with the present invention can also provide for a variable orientation. For example, FIG. 7 shows a light mounting system 124 in accordance with the present invention. The mounting system 124 includes a support structure, or bracket 126, that has a first portion 128, and a second portion 130. Attached to the second portion is a platform 132 having a pivot pin 134 attached thereto. The pivot pin is configured for insertion into a bearing 136 that can be mounted at any convenient location on the boat, for example, on a gunwale. This configuration allows the bracket 126 to be rotated to provide a variable orientation for the light emanating from the lights 138, 140. Thus, embodiments of the present invention not only provide flexibility with regard to changing the location of the bracket and the light in static mounting situations, but also provide the flexibility of allowing a bracket to be pivotally attached for rotation at one mounting location.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A marine light mounting system for attaching a plurality of lights to a marine vehicle, each of the lights having a corresponding housing, the mounting system comprising:
    a support structure for supporting the lights on the marine vehicle, the support structure including a plurality of light mounting portions, each configured to receive a corresponding housing of one of the lights and to facilitate attachment of the corresponding housing to the support structure, the support structure being configured with at least one open area disposed between two of the light mounting portions for facilitating fluid flow through the at least one open area,
    each of the light mounting portions including a corresponding surface configured to cooperate with the corresponding housing such that the corresponding surface is adjacent only a portion of the corresponding housing when the light mounting portion receives the corresponding housing therein, thereby facilitating attachment of the corresponding housing to the support structure while the corresponding light is electrically wired to a power source remote from the corresponding housing.

2. The mounting system of claim 1, wherein each of the surfaces of the light mounting portions includes a contour that generally forms a portion of a circle.

3. The mounting system of claim 1, wherein the marine vehicle includes a trim tab having an adjustable planar surface, the support structure further including a vehicle mounting portion for attaching the support structure to the marine vehicle, the vehicle mounting portion including a tab portion configured to be generally parallel to the trim tab adjustable planar surface when the vehicle mounting portion is attached to the trim tab, the tab portion of the vehicle mounting portion thereby forming an extension of the adjustable planar surface.

4. The mounting system of claim 3, further comprising a reinforcing member configured to be disposed between the support structure and the adjustable planar surface of the trim tab when the vehicle mounting portion is attached to the trim tab.

5. The mounting system of claim 3, wherein the vehicle mounting portion includes a plurality of apertures therethrough for facilitating attachment of the support structure to the marine vehicle.

6. The mounting system of claim 5, wherein at least one of the apertures is disposed through the tab portion.

7. A marine light mounting system for attaching at least one light having a corresponding housing to a marine vehicle, the marine vehicle including a trim tab having an adjustable planar surface, the mounting system comprising:
    a unitary support structure for supporting the at least one light on the marine vehicle, the support structure including a light mounting portion configured to receive a housing of the at least one light and to facilitate attachment of the housing to the support structure,
    the light mounting portion including an arcuate surface configured to cooperate with the housing for attachment of the housing to the light mounting portion, the light mounting portion being configured to receive the housing while the light is electrically wired to a power source remote from the housing,
    the support structure further including first and second generally planar portions, the first generally planar portion having the light mounting portion formed therein, the second generally planar portion extending outwardly from the first generally planar portion, such that the second generally planar portion is generally parallel to the trim tab adjustable planar surface when the support structure is attached to the trim tab, the second generally planar portion thereby forming an extension of the adjustable planar surface.

8. The mounting system of claim 7, wherein the support structure further includes a vehicle mounting portion for attaching the support structure to the marine vehicle, the vehicle mounting portion including a plurality of apertures therethrough for facilitating attachment of the support structure to the marine vehicle.

9. The mounting system of claim 8, wherein at least one of the apertures is disposed through the second generally planar portion.

10. The mounting system of claim 7, wherein the light mounting portion further includes an opening configured to receive the housing therethrough to facilitate cooperation of the housing with the arcuate surface, the opening appearing as an opening when viewed along a plane containing the first generally planar portion.

11. The mounting system of claim 10, wherein the support structure includes a plurality of the light mounting portions, each including a corresponding arcuate surface and a corresponding opening for receiving a corresponding light housing therethrough, the first generally planar portion including at least one open area disposed between two of the arcuate surfaces for facilitating fluid flow therethrough.

12. A method for producing a marine light mounting system for attaching a plurality of lights to a marine vehicle, each of the lights having a corresponding housing, the method comprising:

forming a generally planar support structure;

forming a plurality of light mounting portions in the support structure, each of the light mounting portions being configured with a corresponding opening as viewed along a plane containing the corresponding light mounting portion, thereby facilitating entry of a corresponding housing of one of the lights into the corresponding opening for attachment of the corresponding housing to the corresponding light mounting portion while the corresponding light is electrically wired to a power source remote from the corresponding housing; and forming at least one open area in the support structure between two of the light mounting portions to facilitate the flow of fluid therethrough.

13. The method of claim 12, further comprising bending a first portion of the support structure generally perpendicularly to a second portion of the support structure, the first portion including the light mounting portions.

14. The method of claim 13, further comprising forming a plurality of apertures in the support structure for facilitating attachment of the support structure to the marine vehicle.

15. The method of claim 12, wherein the support structure is formed from a single piece of sheet stock material using at least one of: stamping, laser cutting, wire electrical discharge machining (EDM), or water cutting.

16. The method of claim 12, further comprising forming a plurality of mounting features in each of the light mounting portions for facilitating attachment of respective housings to corresponding light mounting portions.

17. A marine light mounting system for attaching at least one light having a corresponding housing to a marine vehicle, the marine vehicle including a trim tab having an adjustable planar surface, the mounting system comprising:

a support structure for supporting the at least one light on the marine vehicle, the support structure including a light mounting portion configured to receive a housing of the at least one light and to facilitate attachment of the housing to the support structure, the light mounting portion including a surface configured to cooperate with the housing such that the surface is adjacent only a portion of the housing when the light mounting portion receives the housing therein, thereby facilitating attachment of the housing to the support structure while the light is electrically wired to a power source remote from the housing, the support structure further including a vehicle mounting portion for attaching the support structure to the marine vehicle, the vehicle mounting portion including a tab portion configured to be generally parallel to the trim tab adjustable planar surface when the vehicle mounting portion is attached to the trim tab, the tab portion of the vehicle mounting portion thereby forming an extension of the adjustable planar surface.

* * * * *